Figure 1:
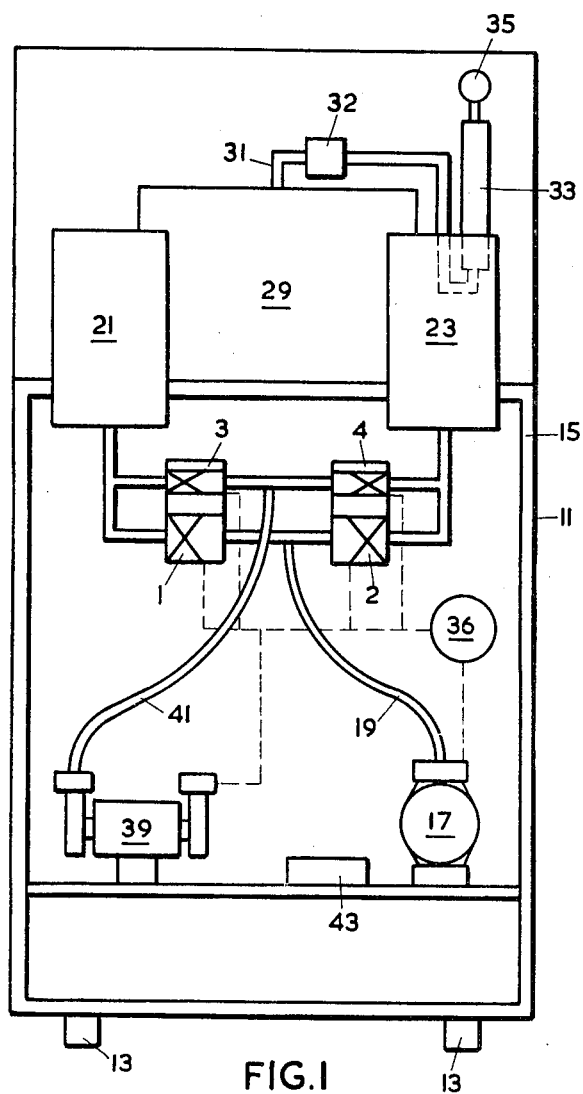

United States Patent [19]

Armond

[11] 4,065,272
[45] Dec. 27, 1977

[54] OXYGEN-ENRICHED AIR

[75] Inventor: John Walter Armond, Great Bookham, England

[73] Assignee: BOC International Limited, London, England

[21] Appl. No.: 645,316

[22] Filed: Dec. 30, 1975

[30] Foreign Application Priority Data

Jan. 2, 1975 United Kingdom ............... 98/75

[51] Int. Cl.² ............................................. B01D 53/02
[52] U.S. Cl. ........................................... 55/25; 55/58; 55/68; 55/75
[58] Field of Search ............... 55/19, 20, 31, 33, 35, 55/58, 68, 74, 75, 163, 387, 389, 25, 26

[56] References Cited

U.S. PATENT DOCUMENTS

| 2,790,512 | 4/1957 | Dow ................................. 55/35 |
| 3,069,830 | 12/1962 | Skarstrom et al. ................. 55/75 X |
| 3,176,444 | 4/1965 | Kiyonaga ........................... 55/75 X |
| 3,182,435 | 5/1965 | Axt ................................... 55/163 X |
| 3,242,650 | 3/1966 | Crawford ........................... 55/163 |
| 3,313,091 | 4/1967 | Berlin ................................ 55/75 X |
| 3,313,092 | 4/1967 | Potts ................................. 55/163 |
| 3,636,679 | 1/1972 | Batta ................................. 55/75 X |
| 3,659,399 | 5/1972 | Kaur, Jr. et al. ..................... 55/33 |
| 3,719,025 | 3/1973 | Heinze et al. ....................... 55/75 X |
| 3,866,428 | 2/1975 | Simonet et al. ...................... 55/75 X |
| 3,923,477 | 12/1975 | Armond et al. ...................... 55/58 X |
| 3,957,463 | 5/1976 | Drissel et al. ........................ 55/58 X |

Primary Examiner—Thomas G. Wyse
Assistant Examiner—Robert H. Spitzer
Attorney, Agent, or Firm—Dennison, Dennison, Meserole and Pollack

[57] ABSTRACT

The invention provides a method for producing oxygen-enriched air for respiration which method utilizes an apparatus which comprises at least one bed containing an adsorbent which preferentially adsorbs nitrogen from air, an air inlet at one end of the bed, an oxygen-enriched air product outlet line connected to the other end of the bed, a reservoir in the outlet line for storing pressurized product gas, a pressure regulator located in the outlet line downstream of the reservoir and adapted to regulate the pressure of product gas in the outlet line downstream of the regulator to a predetermined value, a restriction device located in the portion of the outlet line between the bed and the reservoir to control gas flow in such portion of the outlet line, a valved vent line from the air inlet end of the, or each, bed to permit release of any superatmospheric pressure in such bed and a valved line leading from the air inlet end of the, or each, bed to a vacuum pump to permit evacuation of such bed.

8 Claims, 5 Drawing Figures

OXYGEN-ENRICHED AIR

This invention relates to a process for the preparation of oxygen-enriched air. It is primarily intended for respiratory use by a patient in hospital or at home.

The supply of oxygen-enriched air to a patient for whom atmospheric air is too lean in oxygen has in the past generally required the provision of cylinders of compressed oxygen. These are heavy, difficult for an individual, particularly an invalid, to handle and require a regular and reliable delivery system. The invention relates to the use of a new pressure swing system for enriching air in adsorbent beds so as to give continuous supply of oxygen-enriched air at any location where electrical power is available.

According to the invention there is provided a method for producing oxygen-enriched air for respiration which method utilizes an apparatus which comprises at least one bed containing an adsorbent which preferentially adsorbs nitrogen from air, an air inlet at one end of the bed, an oxygen-enriched air product outlet line connected to the other end of the bed, a reservoir in the outlet line for storing pressurized product gas, a pressure regulator located in the outlet line downstream of the reservoir and adapted to regulate the pressure of product gas in the outlet line downstream of the regulator to a predetermined value, a restriction device located in the portion of the outlet line between the bed and the reservoir to control gas flow in such portion of the outlet line, a valved vent line from the air inlet end of the, or each, bed to permit release of any superatmospheric pressure in such bed and a valved line leading from the air inlet end of the, or each, bed to a vacuum pump to permit evacuation of such bed.

The invention also provides a process for producing oxygen-enriched air for respiration which comprising the sequential steps of passing air under pressure into a bed of an adsorbent that preferentially adsorbs nitrogen and collecting oxygen-enriched product gas from the bed in a reservoir, gas flow between the reservoir and the bed being restricted while the bed is at a lower pressure than the reservoir pressure, passing oxygen-enriched air from the reservoir through a pressure regulator to reduce the product pressure to a predetermined value, venting the bed to atmospheric pressure in a direction counter-current to that of the air introduction, evacuating the bed in the said counter-current direction, refilling the bed to atmospheric pressure by introducing product-quality gas into the bed in the said counter-current direction and then repeating the sequence.

By backfilling the, or each, adsorbent bed to atmospheric pressure, it has been discovered that surprisingly an increase in the purity of the oxygen-enriched product gas can be obtained as compared to the purity of such gas obtained from a similar bed under similar operating conditions with the exception that the bed is backfilled to the superatmospheric pressure of the air fed to the bed. Apparatus according to the invention includes a flow restrictor in the product line between the product reservoir and the outlet of the bed. At the end of the backfilling step, the bed is at atmospheric pressure whereas the reservoir is at a superatmospheric pressure. The flow restrictor is designed to minimise flow of product gas from the reservoir into the bed after the backfilling step which flow could occur during the initial part of the adsorption step until the bed pressure is brought up to the reservoir pressure. The restrictor does not substantially reduce the pressure of the product gas flow to the reservoir during the adsorption step because such flow is substantially less than that during backfilling. It has also been found that in practice a product reservoir is essential to give an adequate capacity of product gas to provide pressurised supply for the patient and to provide an adequate supply of gas for backfilling.

It is necessary to provide the supply of product gas at constant pressure which is sufficiently high to overcome the line resistance and to accommodate devices in the line, e.g. venturi devices which add air to the product gas. A flow meter is usually required in the product line and this is calibrated to operate at a constant pressure. The pressure in the reservoir will usually vary during the cycle, so that a pressure regulator is provided to reduce the reservoir pressure at any time to a constant value, in the line downstream of the reservoir.

The pressure of gas stored in the reservoir is typically at a pressure of 7 to 12 psig. A control valve is located downstream of the pressure regulator and imposes a small pressure drop on gas emerging therefrom. Thus gas leaving the control valve is at a pressure of about 5 psig or below sufficient to carry the product gas through a feed line to the patient but insufficient to cause damage to the patient's lungs. The aforesaid flowmeter should be located between the pressure regulator and the control valve so as to allow accurate metering of product gas to the patient.

The number of adsorbent beds employed in the apparatus is not critical except that in order to ensure a continuous supply of oxgyen-enriched air. For domiciliary application the apparatus needs to be kept as compact as possible and in general this is found most easily attainable with a two bed system.

The adsorbent material in the bed is preferably a zeolite molecular sieve, most preferably zoelite 5A. Other sieves which have proved particularly good include zeolite 13X and 4A/5A hybrid.

In a multi-bed system a spent bed can be regenerated while a regenerated bed is receiving incoming air for enrichment.

Towards the end of the air introduction into a bed, product quality gas from the product end of the bed is conveyed to backfill another bed in the system. The backfill begins with the other bed at reduced pressure and is continued until the other bed reaches atmospheric pressure. The period for which backfilling occurs is typically the final one sixth of the air admission period. Restoration of the other bed to atmopheric pressure can be ensured by locating a throttle in the line carrying the backfill and appropriately adjusting the size of the throttle. The other bed is thus at atmospheric pressure when the air feed is switched to the other bed and we have found that an initial atmospheric pressure in the bed gives advantages in the adsorption stage.

The super-atmospheric pressure to which the or each adsorbent bed is raised during the air introduction stage is preferably in the range 10 to 15 psig.

Although in many instances the throttle can be simple an orifice of appropriate size it can alternatively be a length of tubing of restricted internal diameter. By using such a length of tubing the throttle can very conveniently be built into the system.

At the end of the air introduction stage (including the final portion of air introduction during which oxygen enriched gas may be backfilled into another bed) air introduction is stopped, the outlet from the bed is closed and the bed is regenerated first by venting to atmospheric pressure and then by evacuation with a vacuum pump. In general the lower the vacuum the better the degree of separation of oxygen from the introduced air. Typically the vacuum pressure is about 75 to 125 torr. As a final stage of the bed restoration the evacuation is ceased and product quality gas is introduced into the bed in a reverse direction. The bed is then restored ready to receive a new batch of air to be separated. A particular attraction of this system is that the actual volume of gas (measured at its particular pressure in the process) flowing through the bed in a reverse direction exceeds that flowing into the bed in a inwards direction with resultant benefits in the degree of restoration of the bed.

The vent line from the bed will generally be separate from the vacuum line. With certain forms of vacuum pump it is however possible to use a single line in which the vacuum pump is disposed to allow the bed to vent through the vacuum pump until the bed pressure has been reduced to atmospheric pressure and then bring the vacuum pump into operation to bring about the evacuation of the bed.

During the air introduction stage the initial layers of the bed are primarily to remove moisture and carbon dioxide from the bed and subsequent layers effect the separation of oxygen from nitrogen. If desired the initial layer of the bed can be formed of a material with preferential moisture adsorbent properties, for example silica gel. Alternatively a pre-treatment bed containing such a moisture adsorbent can be provided for each air separation bed, being located upstream of the air separation bed with respect to the direction of the air flow. Backflow of gas through the moisture/carbon dioxide adsorbent layer or bed during the venting, evacuation and backfill steps effects the regeneration of the moisture adsorbent bed.

The vessels in which the adsorbent materials are located can be of the convential elongated tubular form but in order to conserve space in the unit an alternative version of the vessel has been devised for use with the system of the invention. This alternative vessel comprises an outer tube and an inner tube with a substantially annular space between them. At one end both tubes are connected to an end plate which includes one or more inlets into the annular portion and one or more outlets from the inner portion. At the other end the outer tube is sealed by an end plate having neither inlets nor outlets but the inner tube stops short of the end plate thus leaving an opening for passage of gas from the annular portion to the inner portion. the inner tube is preferable coaxial with the outer tube. The whole of the space within the annular portion and the inner portion is preferably filled with adsorbent material.

In one particularly convenient application two such adsorbent-containing vessels are located within a third vessel which acts as the product gas reservoir. This gives a particularly compact configuration to the arrangement of beds.

For use in a hospital or at home a unit according to the invention is preferably located in one position and feed-lines for delivery of oxygen are installed to the appropriate rooms or locations. The patient employs a face-mask or nasal cannula with suitable plug-in attachments for connection to the oxygen supply lines.

On starting a unit that includes a reservoir it is preferred to sweep out the reservoir with product quality gas before connecting up the patient's face-mask or catheter. This ensures that the patient does not receive anything other than product quality gas.

Switching of the beds from adsorption to regeneration and the various substages within these parts of the cycle is effected in the customary way by means of a timing cycle. In order to protect the patient and his family from any noise nuisance caused by the operation of the unit it is preferably enclosed within a soundproofing layer.

In its preferred form an oxygen enrichment unit, according to the invention is provided with the safety features such that in the event of power failure the unit will switch off automatically. It will not restart without stop and start buttons being pressed (whereupon power is restored) or the conditions causing the original shut down correct themselves or are corrected.

The following safety devices are preferably provided to switch the apparatus off and sound an alarm.

1. A high pressre switch, located on the inlet line to the or each adsorption bed, protects against excessive pressure built up. The compressor also has a relief valve but this dose not operate the automatic switch off.
2. A low pressure switch is located on the outlet side of the or each adsorption bed to prevent vacuum being applied to the reservoir.
3. & 4. Thermostats are provided on the compressor and vacuum pump to protect against for example seized bearings or overheated motors.
5. A thermostat is located in the upper region of the sound proof box to protect against general overheating.
6. An air flow switch is provided to detect failure of the ventilating fan.
7, 8, & 9. Circuit breakers are provided to protect the compressor, vacuum pump and fan against electrical overloading.

Figure 2:
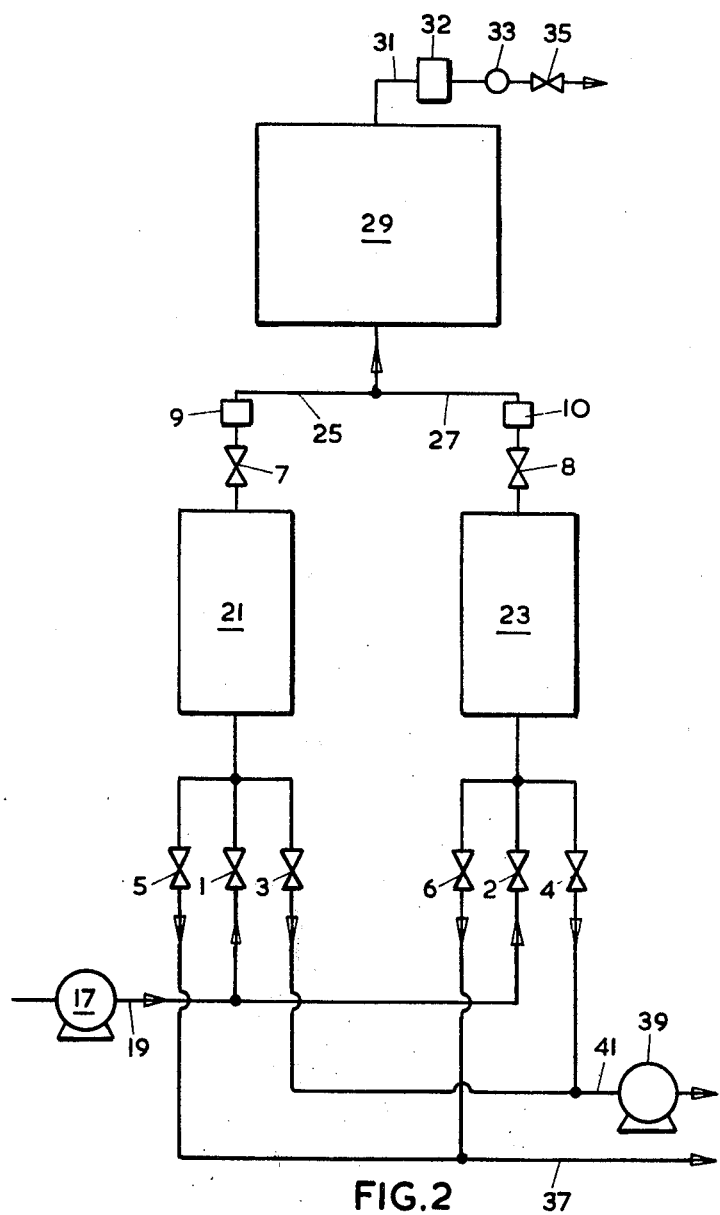
Figure 3:
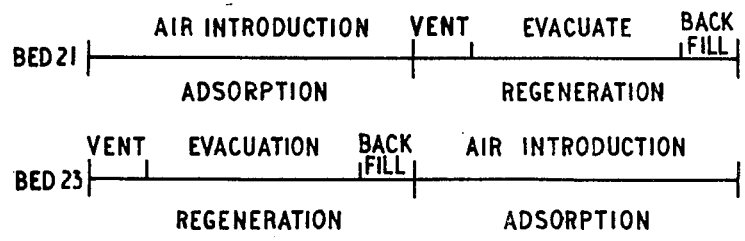
Figure 4:
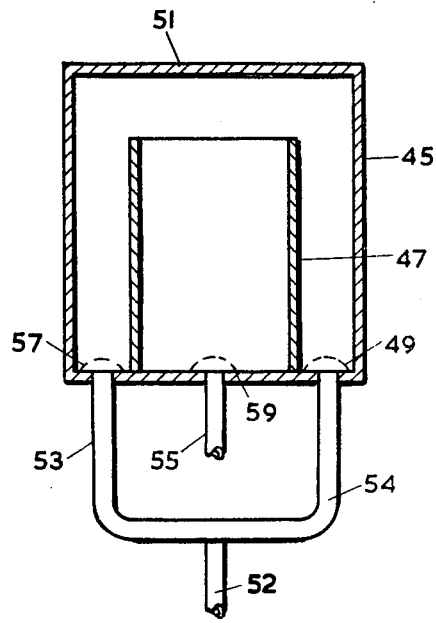
Figure 5:
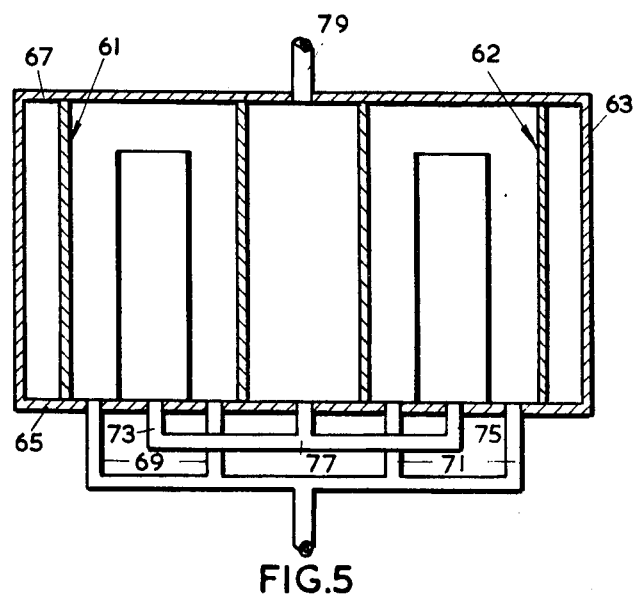

The invention is described below with reference to the accompanying figures in which FIG. 1 is a diagrammatic view, partly in section, of an air separation unit according to the invention, FIG. 2 is a diagrammatic flow chart of the system according to the invention, FIG. 3 is a timing cycle for use with a unit as shown in FIGS. 1 and 2, FIG. 4 is a sectional view of an improved adsorption vessel according to the invention and FIG. 5 is a sectional view of a combined reservoir and adsorption vessel module for use in a unit according to the invention.

The unit in FIGS. 1 and 2 comprises a housing 11 mounted on wheels 13 and enclosed within a soundproofing layer 15.

An air compressor 17 feeds air at a pressure of about 12 psig through a feed line 19 and through a solenoid valve 1 or 2 to respectively an adsorption bed 21 or an adsorption bed 23. The outlet lines 25, 27 (not shown in FIG. 1) from respectively beds 21 and 23 include change-over valves 7 and 8 respectively and throttle valves 9 and 10 respectively. Both the outlet lines 25 and 27 lead to a reservoir 29 and carry product gas at a pressure of about 10 psig. The beds 21 and 23 and the reservoir 29 are filled with zeolite molecular seive 5A apart from the lower layers of beds 21 and 23 which are silica gel. The outlet line 31 from the reservoir 29 passes to a pressure regulator 32, a flowmeter 33 and an on/off valve 35. The pressure regulator reduces the product pressure to about 5 psig. Operation of the valves 1, 2, 3, 4, 5, 6, 7, and 8 and the vacuum pump 39 is controlled by a timer 36.

The beds 21 and 23 alternately receive incoming air through respectively valves 1 and 2. As is shown in FIG. 3, while bed 21 is receiving air, bed 23 is first being vented, through valve 6 and vent line 37, , then evacuated through valve 4 by means of a vacuum pump 39 through outlet line 41. Oxygen-enriched air produced from the air introduced into bed 21 passes into the reservoir 29 until bed 23 has been evacuated to the desired level. Valve 4 is then closed, valves 6 and 2 being already closed, and valve 8 is opened allowing oxygen enriched air to flow into bed 23 in a reverse direction. The timing cycle and the size of the throttles 9 and 10 are selected such that the period of this reverse fill brings the pressure in the bed 23 to atmospheric pressure. Valve 7 is then closed, valve 2 is opened and compressed air enters bed 23 giving oxygen-enriched air which flows into the reservoir 29. Bed 21 is then subjected to a regeneration cycle equivalent to that for bed 23, being first vented through valve 5 and line 37 to atmospheric pressure, then evacuated through valve 3 and line 41 and finally backfilled through valve 7 with product quality gas.

The patient draws oxgyen-enriched gas as required from the outlet line 31, the pressure of the gas being kept below 7 psig by the pressure regulator 32. The unit is provided with a ventilation fan 43 so as to provide cooling to compensate for the heat generated in the unit by the operation of the air compressor 17 and vacuum pump 39.

The alternative form of adsorbent vessel shown in FIG. 4 includes an outer tube 45 and a coaxial inner tube 47. One end of both tubes is closed by an end plate 49 and the other end of tube 45 is closed by an end plate 51. The inner tube 47 stops short of the end plate 51 so as to permit passage of gas from the inner tube to the outer tube.

An air inlet 52 branches into two inlets 53 and 54 through the end plate 49 into the annular space between the tubes 45 and 47. An outlet tube 55 leads from the interior of the inner tube 47 through the end plate 49. Protective gauzes 57 and 59 are located adjacent to respectively inlet 53 and outlet 55 to prevent escape of adsorbent material from the bed.

FIG. 5 shows two such vessels 61 and 62 located inside a reservoir 63 which is filled with an adsorbent material. The vessels and the reservoir are of circular cross-section, the section for FIG. 5 being taken along the diameter of the reservoir 63 that coincides with diameters of the vessels 61 and 62. For ease of illustration the valves in the various inlet and outlet lines are not shown in the Figure. The end plates 65 and 67 of the reservoir 63 also form the end plates of the vessels 61. The lower end plate 65 carries inlets 69 and 71 to the vessels 61 and 62 respectively and outlets 73 and 75 from the said vessels. The outlets 73 and 75 lead via a conduit 77 to the reservoir 63. The other end plate 67 carries an outlet pipe 79 leading to the patient.

The whole of the space inside both tubes is preferably filled with adsorbent material. If a moisture adsorbent is employed this should be located adjacent to the end plate 49 in the space between the tubes 45 and 47.

An air separation unit according to the invention offers the advantages of being compact, easy to instal and operate and includes several safety features to ensure the protection of the patient.

What we claim is:

1. A process for producing oxygen-enriched air for respiration which comprises the sequential steps of passing air under superatmospheric pressure in a first direction into an inlet end of a unitary bed of an adsorbent that preferentially adsorbs at least moisture and nitrogen, and collecting an oxygen-enriched product gas from an outlet end of the bed in a reservoir at superatmospheric pressure, passing oxygen-enriched product gas from the reservoir through a pressure regulator to reduce the product gas pressure to a predetermined value for delivery for end use, regenerating the bed by venting the bed to atmospheric pressure in a direction counter-current to that of the superatmospheric pressurized air introduction in the first direction, evacuating the bed in the said counter-current direction to below atmospheric pressure, regulating the venting and the evacuating of the bed by utilization of selected differential pressures so that at the inlet end of the bed the actual volume of gas withdrawn during the venting and the evacuating exceeds the actual volume of superatmospheric pressure air fed into the inlet end of the bed in the first direction, backfilling the bed in said counter-current direction to generally atmospheric pressure by introducing product-quality gas from a source at superatmospheric pressure, whereby the regeneration of the bed is enhanced by moving residual gaseous material in the bed closer to the inlet end of the bed to thereby enhance desorption of adsorbent at the outlet end of the bed.

2. A process as claimed in claim 1 wherein the pressure in the regulator is in the range 7 and 12 psig.

3. A process as claimed in claim 1 wherein product gas leaving the regulator is passed through a control valve to further reduce its pressure to 5 psig or below that valve.

4. A process as claimed in claim 1 for a system having more than one bed wherein each bed is backfilled with product gas from another of the beds as well as from the reservoir and the backfilling is continued until the bed reaches atmospheric pressure.

5. A process as claimed in claim 4 wherein the period for which backfilling occurs is substantially one sixth of the air admission period.

6. A process as claimed in claim 5 wherein restoration of the bed to atmospheric is carried out by appropriately adjusting the size of a throttle in the line carrying the backfill.

7. A process as claimed in claim 1 wherein the adsorbent bed is raised during the air introduction stage to a pressure in the range 10 to 15 psig.

8. A process as claimed in claim 1 wherein the bed is subjected to a vacuum pressure in the range 75 to 125 torr during evacuation thereof.

* * * * *